UNITED STATES PATENT OFFICE.

WILLIAM BOIES, OF TROY, NEW YORK.

IMPROVEMENT IN PROCESSES OF COLORING BRICKS.

Specification forming part of Letters Patent No. 127,551, dated June 4, 1872.

Specification describing a certain Improvement in Making Bricks, invented by WILLIAM BOIES, of the city of Troy, in the State of New York.

This invention has for its object the producing of uniformity in color of bricks for building and other purposes. It is not limited to merely coloring the exterior or surface of the brick, in the character of a coating or veneering, but extends throughout the entire substance of the brick, so that in the breaking of a brick or the chipping off of a portion to adapt it to the wall, the surfaces exposed will be of the same color as the outer surface of the brick. The invention consists in mixing or combining with the clay or other material for making brick a certain quantity of crude or natural ochre previous to the molding of the brick. The proportion of ochre to the clay or material will depend upon the quality and uniformity of color of the clay or material, and upon the degree of color it is desired to impart to the brick. In light colored or varied or mixed clays, if a high color is required, the larger quantity of ochre, comparatively, will be needed, and in clays heavily charged with oxides of metals and varying but little in color the lesser quantity of ochre will be used.

Brick made under this invention, when burned properly, will present great uniformity in color, and will be, therefore, more valuable for building purposes.

The ochre can be mixed and incorporated with the clay or material in the "soak-pit" or "pug-mill," or at any point of time in the process between the taking of the clay from the bank and the molding of the brick, the important part being the thorough mixing and incorporating or combining of the ochre with the clay or other material before the drying and burning of the brick.

What I claim is—

Mixing or combining the crude or natural ochre with clay or material for making bricks, as herein recited.

This specification signed this 28th day of December, 1871.

WILLIAM BOIES.

Witnesses:
S. F. GREENE,
THOS. J. GUY.